United States Patent
Thilderkvist et al.

(10) Patent No.: US 10,303,144 B2
(45) Date of Patent: May 28, 2019

(54) OBJECT CREATION IN PROCESS CONTROL SYSTEMS

(71) Applicant: ABB Schweiz AG, Baden (CH)

(72) Inventors: Hans Thilderkvist, Malmö (SE); Staffan Andersson, Lund (SE); Thomas Pauly, Västerås (SE); Ulf Hagberg, Lund (SE)

(73) Assignee: ABB Schweiz AG, Baden (CH)

(*) Notice: Subject to any disclaimer, the term of this patent is extended or adjusted under 35 U.S.C. 154(b) by 47 days.

(21) Appl. No.: 15/322,914

(22) PCT Filed: Aug. 11, 2014

(86) PCT No.: PCT/EP2014/067164
§ 371 (c)(1),
(2) Date: Dec. 29, 2016

(87) PCT Pub. No.: WO2016/023573
PCT Pub. Date: Feb. 18, 2016

(65) Prior Publication Data
US 2017/0153617 A1    Jun. 1, 2017

(51) Int. Cl.
  *G05B 19/042*     (2006.01)
(52) U.S. Cl.
  CPC ............ *G05B 19/0426* (2013.01); *G05B 2219/23255* (2013.01)
(58) Field of Classification Search
  CPC .......... G05B 19/0426; G05B 2219/23255
  (Continued)

(56) References Cited

U.S. PATENT DOCUMENTS 5,838,563 A * 11/1998 Dove ............... G05B 19/0426
                                                              700/83
5,950,006 A *  9/1999 Crater .............. G05B 19/0426
                                                              717/127
(Continued)

FOREIGN PATENT DOCUMENTS

| CN | 101158870 A | 4/2008 |
|----|-------------|--------|
| CN | 102890453 A | 1/2013 |
| WO | 0102953 A1  | 1/2001 |

OTHER PUBLICATIONS

IEC/ISO: "IEC 81346-1; Industrial systems, installations and equipment and industrial products—Structuring principles and reference designations—Part 1: Basic rules=Syst GBP emes industriels, installations et appareils. et produits industriels—Principes de structuration et designations de reference" International Standard—Iecnorme Internationale—CEI, vol. 81346-1, Jul. 31, 2009 (Jul. 31, 2009), pp. 1-170, pp. 1-82.

(Continued)

*Primary Examiner* — Duy Khuong T Nguyen
*Assistant Examiner* — Theodore E Hebert
(74) *Attorney, Agent, or Firm* — Whitmyer IP Group LLC (57) ABSTRACT

A computer-implemented method for creating software objects in a process control system. The method is performed by a processing tool. The method includes creating a process object in the process control system, the process object having at least two aspects. The method includes instantiating at least one instance of the process object in the process control system. The process object is defined by a control device object type having at least two aspects. The control device object type inherits at least one aspect of the at least two aspects from a control object type and inherits at least one other aspect of the at least two aspects from a (Continued)

device object type. There is also provided a processing tool, a computer program, and a computer program product.

17 Claims, 10 Drawing Sheets

(58) Field of Classification Search
USPC .......................................................... 717/108
See application file for complete search history.

(56) References Cited

U.S. PATENT DOCUMENTS

| | | | | |
|---|---|---|---|---|
| 6,163,544 | A * | 12/2000 | Andersson | H04L 41/0233 370/422 |
| 6,268,853 | B1 * | 7/2001 | Hoskins | G05B 15/02 700/83 |
| 7,096,465 | B1 * | 8/2006 | Dardinski | G05B 19/0426 717/121 |
| 7,693,585 | B2 * | 4/2010 | Kalan | G06Q 10/10 340/870.31 |
| 8,010,940 | B2 * | 8/2011 | van Wyk | G06Q 10/06 717/104 |
| 2002/0026592 | A1 * | 2/2002 | Gavrila | G06F 21/6218 726/6 |
| 2002/0046208 | A1 * | 4/2002 | Andersson | G06F 17/30067 |
| 2002/0046266 | A1 * | 4/2002 | Muralidhar | G05B 19/0426 709/220 |
| 2006/0026193 | A1 * | 2/2006 | Hood | G05B 19/0426 |
| 2006/0129683 | A1 * | 6/2006 | Hansen | G06F 9/465 709/229 |
| 2010/0222902 | A1 * | 9/2010 | Eldridge | G05B 15/02 700/87 |
| 2012/0005270 | A1 * | 1/2012 | Harding | G05B 19/4148 709/203 |
| 2017/0153617 | A1 * | 6/2017 | Thilderkvist | G05B 19/0426 |
| 2017/0300042 | A1 * | 10/2017 | Pauly | G05B 19/4186 |

OTHER PUBLICATIONS

International Preliminary Report on Patentability Application No. PCT/EP2014/067164 Completed: Jul. 25, 2016 6 pages.
International Search Report & Written Opinion of the International Searching Authority Application No. PCT/EP2014/067164 completed: Apr. 10, 2015; dated Apr. 24, 2015 12 pages.
John Sharp: "Microsoft Visual C# 2013 Step by Step", In: "Microsoft Visual C# 2013 Step by Step", Dec. 31, 2013 (Dec. 31, 2013), O'Reilly Media Inc., Sebastopol, Ca., USA, pp. 287-315, p. 291, "Working with multiple inerfaces"; pp. 304-305, "Abstract classes".
Chinese Office Action Application No. 201480080558.3 dated Jul. 2, 2018 7 Pages.

* cited by examiner

OBJECT CREATION IN PROCESS CONTROL SYSTEMS

TECHNICAL FIELD

Embodiments presented herein relate to process control systems, and particularly to a method, a processing tool, a computer program, and a computer program product for creating objects in a process control system.

BACKGROUND

The international standard IEC 81346-1 "Industrial systems, installations and equipment and industrial products—Structuring principles and reference designations" provides a basis for establishing models of industrial plants, machines, buildings etc., by specifying principles for structuring of objects including associated information. As used in the international standard IEC 81346-1 the term "object" means an entity treated in a process of development, implementation, usage and disposal, and may refer to a physical or non-physical "thing", i.e. anything that might exist, does exists, or did exist. Moreover, an "object" has information associated to it.

Most objects correspond to a physically existing and thus tangible object (e.g. a motor, a pump, a valve, a sensor, a building, etc.). However, there are objects that do not have a physical correspondence but exist for different purposes, for example an object may exist only by means of the existence of its sub-objects. That is, the object may be defined for structuring purposes (e.g. a system); or an object may exist for enabling identification of a set of information.

IEC 81346-1 does not distinguish between objects that have a physical existence and those that do not. Both kinds of objects are relevant for being identified and handled in the life-cycle of a system.

When describing the interior of an object and its interrelations to other objects, it may be useful to regard the object from different views. In IEC 81346-1, these different views of an object are called "aspects". The aspects dealt with in IEC 81346-1 are focused on: 1) what an object is intended to do or what it actually does—the function aspect; 2) by which means an object does what it is intended to do—the product aspect; and 3) intended or actual space of the object—the location aspect. In addition other aspects may be applied.

An "object type" according to IEC 81346-1 is a class of objects having the same set of characteristics. Depending on the number of common characteristics, object types may be very generic or very specific. In general terms, an individual is a specimen of a type.

IEC 81346-1 also defines structuring principles. An aspect of an object provides the possibility to determine sub-objects of the object in that aspect. Each sub-object may also be viewed in the same aspect, which results in lower-level sub-objects. The result is a successive subdivision of the objects viewed in a particular aspect. This subdivision may thus be represented as a tree. The same object may occur in several such structures, for example depending on its aspects. Specifically, IEC 81346-1 discusses function oriented, product oriented, and location oriented structures. Other structures based on other aspects may be used as required.

International patent application WO0102953 entitled "Method of integrating an application in a computerized system" discloses a method for integration of many and various types of applications in a computerized system for control of real world objects. The method disclosed in WO0102953 is based on a concept where real world objects are represented as "composite objects" (in the following referred to as "aspect objects"). Different facets of a real world object, such as its physical location, the current stage in a process, a control function, an operator interaction, a simulation model, some documentation about the object, etc., are each described as different aspects of the aspect object. The aspect object is a container for one or more such aspects. Thus, an aspect object is not an object in the traditional meaning of object-oriented systems, but rather a container of references to such traditional objects, which implement the different aspects. Each aspect, or group of aspects, may be implemented by an independent software application, which provides its functionality through a set of interfaces that are accessible through the aspect object. Each aspect object may be placed in one or more structures. WO0102953 thus describes how a control system can be implemented such that the system can be engineered and operated in accordance with the principles of IEC 81346-1.

One possible extension of the concepts defined in WO0102953 could be to add support for aspect object types. This could make it possible to create and efficiently re-use standardized solutions to frequently recurring problems. For example, rather than creating an Aspect Object from scratch for every valve in a plant, a set of valve types may be defined, and then all valve objects as instances of may be created using these types. Each instance of an aspect object type could then inherit the aspects that are defined by its type.

A further possible extension of the concepts described above could be to add support for object type specialization, i.e. allowing more specialized object types (sub-types) to inherit characteristics from a more general object type (super-type), and extend the functionality by appending one or more additional aspects or extending existing ones. For example, from a generic valve type that has a certain set of aspects, specializations for block valves, control valves, etc., may be created by adding aspects and aspect details that are specific to those types.

By creating object types for all common process devices, such as valves, pumps, motors, etc., with aspects for related control functions, such as open/close, start/stop, PID controller, etc., libraries may be built with aspect object types that may be instantiated to achieve the desired functionality for a wide group of control problems.

However, one issue with the approach described above is that with a wide variety of process devices and control functions, the number of possible combinations becomes very large. This in turn results in a very large number of aspect object types, many of which differ only in minor details, making such libraries expensive to develop and maintain, and difficult to comprehend and use.

U.S. Pat. No. 6,268,853 B1 discloses a development tool for use in specifying at least a sub-set of information required to generate control tools for an industrial process wherein the process is performed by mechanical resources, the control tools include execution logic, simulation facilitating tools, diagnostic tools, HMI tools and schematic diagrams, the development tool including a plurality of control assembles (CA), a separate CA for each mechanical resource type, which can be instantiated by selection and parameterization via an editor to specify the required information, after instantiation, the CAs compiled to generate the tools.

Hence, there is still a need for an improved creation of objects in a process control system.

SUMMARY

An object of embodiments herein is to provide improved creation of objects in a process control system.

The inventors of the enclosed embodiments have realized that a more efficient approach for creating objects in a process control system could be to create separate aspect object types for the process devices and the control functions, respectively. The process device object types may then have aspects for the functions and features that are characteristic of a process device, including the signal interface it provides for access to information and control of the device. Similarly, control function object types may then have aspects that are characteristic for them, such as the control function, graphics for an operator interface, and a description of the required signal interface. To create a control solution for a specific problem, an application engineer could select the proper device object and control object types, and create an aspect object instance that inherits the aspects of both. In object oriented programming, this is known as multiple inheritance.

Figure 1:
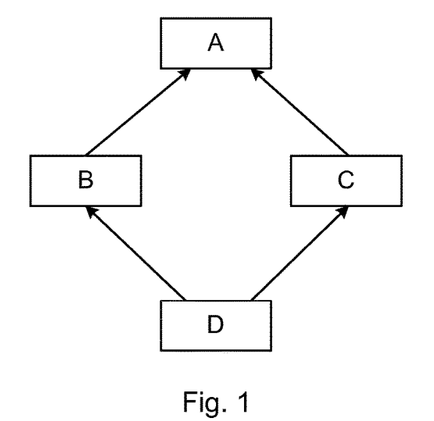
FIG. 1 is a schematic diagram illustrating object inheritance according to prior art.

Multiple inheritance allows an object, or class, to inherit characteristics and features from more than one parent object, or parent class. It is distinct from the more common single inheritance, where an object, or class, may only inherit from one particular object, or class. However, multiple inheritance is often avoided because it is considered to increase complexity and create ambiguity in many situations. One such situation is the "diamond problem" illustrated by the class diagram in FIG. 1. This is an ambiguity that arises when two classes B and C inherit from A, and class D inherits from both B and C. If there is a characteristic in A that B and/or C has overridden, and D does not override it, then it may not be clear which version of the characteristic does D inherit; it could be that of B, or it could be that of C.

Particularly, according to a first aspect there is presented a computer-implemented method for creating software objects in a process control system. The method is performed by a processing tool. The method comprises creating a process object in the process control system, the process object having at least two aspects. The method comprises instantiating at least one instance of the process object in the process control system. The process object is defined by a control device object type having said at least two aspects. The control device object type inherits at least one aspect of the at least two aspects from a control object type and inherits at least one other aspect of the at least two aspects from a device object type.

Advantageously this provides efficient creation of objects in a process control system.

Advantageously, the present invention describes how multiple inheritance can be used in a process control system to increase reusability and engineering efficiency and at the same time reduce complexity and ambiguity.

According to a second aspect there is presented a processing tool for creating software objects in a process control system. The processing tool comprises a processing unit. The processing unit is configured to create a process object in the process control system, the process object having at least two aspects. The processing unit is configured to instantiate at least one instance of the process object in the process control system. The process object is defined by a control device object type having said at least two aspects. The control device object type inherits at least one aspect of the at least two aspects from a control object type and inherits at least one other aspect of the at least two aspects from a device object type.

According to a third aspect there is presented a computer program for creating software objects in a process control system, the computer program comprising computer program code which, when run on a processing unit, causes the processing unit to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present invention relates to a system for control of real world objects based on an aspect object information model, which describes how aspects and aspect objects are represented in the system, and how aspects and aspect objects are used to model a plant.

In the following, where there is no risk for misunderstanding, the shorter terms "object" and "object type" are frequently used instead of "aspect object" and "aspect object type". Further, the term "object" always means "object instance", whereas object types are always referred to with the term "object type". Additionally, all herein disclosed objects and object types are implemented in software. In other words, the objects and object types are computer-implemented software objects and object types. Hence the herein disclosed mechanisms for creating objects in a process control system may be regarded as computer-implemented mechanisms for creating software objects in a process control system.

Aspect Object Information Model: In general terms, the aspect object information model describes how aspects and objects are represented in a system, such in a process control system, and how aspects and objects are used to model industrial plants, machines, buildings etc. in the system.

Figure 2:
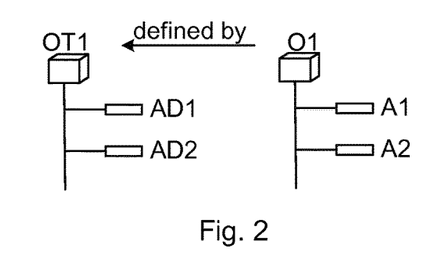
FIGS. 2 to 14 are schematic diagram illustrating objects, object types, object definitions, and object inheritance, according to embodiments.

Aspects and Objects: In general terms, an aspect object represents a physical object, e.g. a valve or a motor, or a "soft" object such as a control loop or a recipe, and is defined by an object type. The object is composed of one or several aspects, where each aspect is defined by an aspect definition on the defining object type. FIG. 2 shows an example where the object O1 has been created from object type OT1. Aspects A1 and A2 on object O1 are defined by their corresponding aspect definitions AD1 and AD2 on object type OT2.

In general terms, an object type defines the content and behavior of all objects instantiated from the object type, through its contained aspect definitions. When an object instance is created, aspects are instantiated on the object, as defined by the aspect definitions on the object type.

In general terms, object types may be simple or structured. Instantiation of a simple object type results in one object instance. Instantiation of a structured object type results in a structured object, e.g. as a collection of hierarchically organized objects.

In general terms, an aspect contains instance specific data such as properties, child references, object references etc. The content and behavior of the aspect is defined by its aspect definition.

In general terms, an aspect definition defines the content and behavior of an aspect in an instance-independent way. It comprises formal declarations, such as formal properties, formal child references etc.

Structured object type: A simple object type describes one object; each time it is instantiated, precisely one object is created. A structured object type describes a set of objects, hierarchically organized with a parent object and one or several child objects. Each time it is instantiated a structured object, with a parent object and a set of child objects, are created.

Each child object may be defined by a formal child in an aspect definition. A formal child specifies the object type and a formal name for a child. On an instance of the structured object type, the actual parent-child relations are defined by child references on the corresponding aspects.

Figure 3:
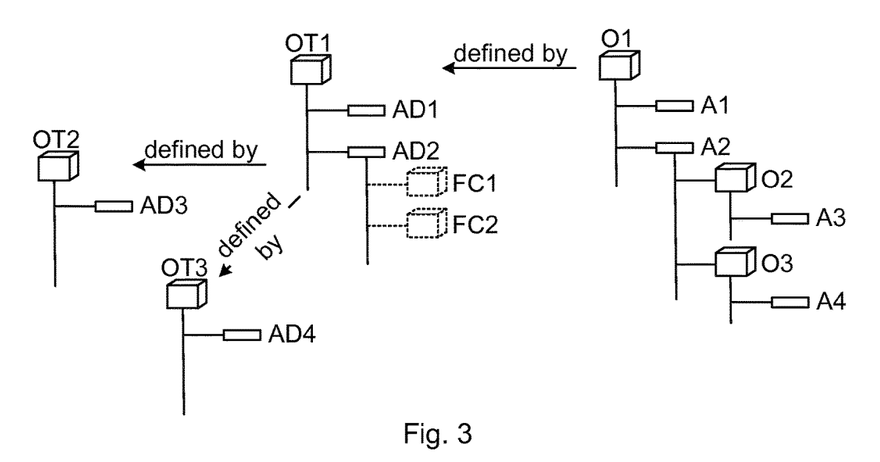

FIG. 3 shows an example where a structured object O1 (having aspects A1 and A2) is created from the structured object type OT1. The O1-O2 and O1-O3 parent-child relations (FC1, FC2) are part of aspect A2 which is defined by aspect definition AD2. AD2 specifies two formal children, represented by dashed lines in the figure. The object types for the formal children are denoted OT2 and OT3 with aspects definitions AD3 and AD4 resulting in aspects A3 and A4 at object O1, respectively.

A structured object type may have multiple aspect definitions with formal children.

Single Inheritance: An engineer, technician, developer, etc. may create an object type as a specialization, or subtype, of an existing object type, denoted a supertype. Further, a so-called subtype inherits all aspect definitions from its supertype, and extends it by adding aspects definitions or by extending inherited aspect definitions.

In general terms, the following three rules may apply. Firstly, a subtype inherits all the aspect definitions from its supertype. Inheritance is transitive, i.e., if object type B inherits from A, and C inherits from B, then C inherits from both A and B. Secondly, a subtype may add aspect definitions to those inherited from its supertype. Thirdly, an aspect definition specifies whether it is extensible or not. If it is extensible, a subtype that inherits the aspect definition may override (extend) its characteristics and functionality.

Figure 4:
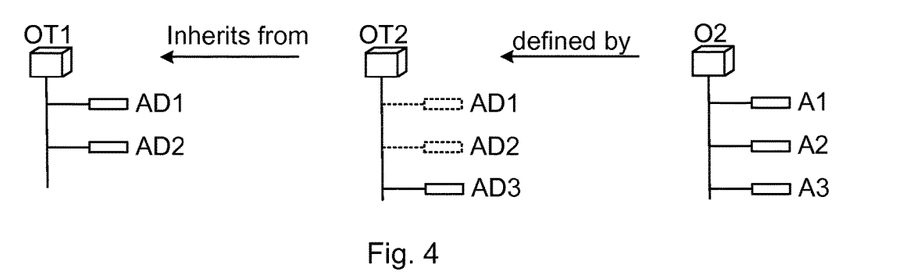

In FIG. 4 the object type OT2 extends object type OT1 (having aspect definitions AD1, AD2) by adding an aspect definition AD3. The object O2 is of type OT2. Its aspects are thus defined by the aspect definitions of OT2 plus those inherited from OT2's super-type OT1. Inherited aspect definitions are represented by dotted elements in the figure.

As mentioned above, it could be possible to create object types for all common process devices, such as valves, pumps, motors, etc., including aspects for related control functions, such as open/close a valve, start/stop a pump, control a proportional-integral-derivative (PID) controller, etc. This would allow libraries to be built with object types that can be instantiated to achieve the desired functionality for a wide group of control applications. However, an issue with this approach is that with a wide variety of process devices and control functions, the number of possible combinations becomes very large, resulting in a very large number of object types, many of which differ only in minor details, making such libraries expensive to develop and maintain, and difficult to comprehend and use.

Multiple Inheritance: Multiple inheritance makes a better and more efficient approach possible. In this approach, different object types are developed for process devices and control functions, respectively. Device object types may have aspect definitions for functions and features that are characteristic of a process device. Similarly, control object types may have aspect definitions that are characteristic of them, such as the control function and graphics for an operator interface.

Particularly, an object type may inherit from more than one supertype. This is called multiple inheritance. The resulting object type inherits all the aspect definitions of all its supertypes, and may add its own aspect definitions and aspect definition extensions. The following three rules may apply to multiple inheritance, in addition to those defined for single inheritance above. Firstly, a subtype may inherit from more than one supertype. Secondly, two or more of the supertypes must not have aspect definitions with the same name, unless they in turn are inherited from a common supertype. Thirdly, if two or more supertypes inherit an aspect definition from a common supertype, and at least one of the supertypes extends the inherited aspect definition, then the resulting aspect definition on the subtype will be a merge of said extensions. If conflicts are detected during the merge, this is considered an error and the multiple inheritance is not allowed. Examples of merge conflicts include extending with formal properties, formal children or formal object references with the same name. This eliminates the "diamond problem" as described above.

Figure 5:
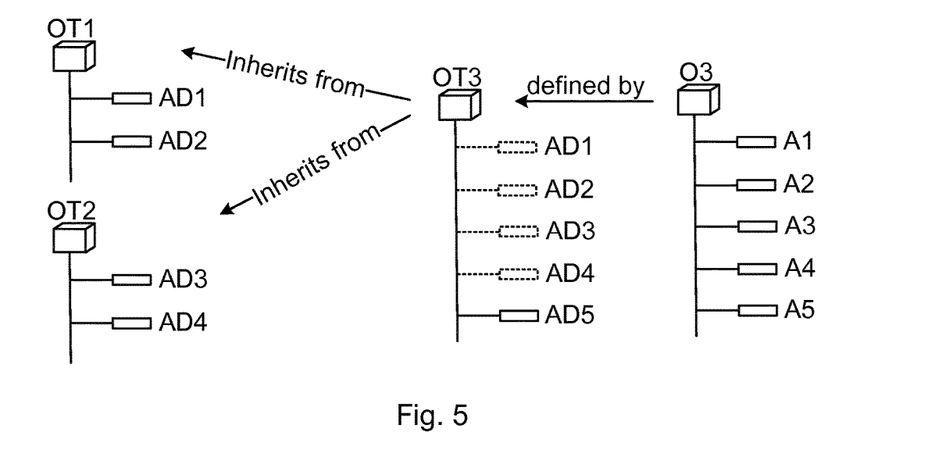

In FIG. 5 the Object Type OT3 in extends both OT1 (having aspect definitions AD1, AD2) and OT2 (having aspect definitions AD3, AD4), adding the aspect definition AD5. The instance O3 is of type OT3. Its aspects are defined by the object type OT3 plus those defined by the object type OT3's super-types OT1 and OT2.

Object References: In general terms, object references may be used to create relations other than parent-child relations between objects. Whereas parent-child relations always are within the same structure, object references are typically between objects in different structures. Examples of object references include allocation of system parts to nodes, and connection of control functions to process devices.

In general terms, object references are held by aspects as defined by formal object references in their aspect definitions. An aspect definition may have multiple formal object references and an object type may have multiple aspect definitions with formal object references. A formal object reference specifies the object type and a formal name for the object to be referenced.

Object references are created by an engineer, technician, developer, etc. as part of system or application configuration. Alternatively they may be automatically created at instantiation of a structured object type. In the latter case, the formal object reference specifies a relative path for the object reference that is to be created at instantiation.

Figure 6:
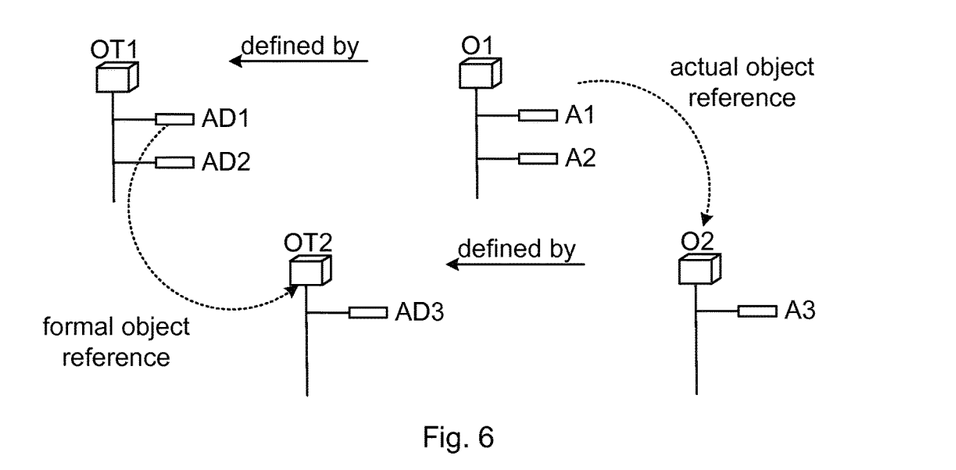

FIG. 6 shows an example where aspect definition AD1 of object type OT1 defines a formal object reference, represented by a dotted line in the figure. The object type for the formal object reference is object type OT2. When an engineer, technician, developer, etc. creates the object O1 as an instance of the type OT1, he/she will be asked to provide an actual object reference for the type's formal object reference. The system will verify that the referenced object is of the correct type, in this example OT2. In FIG. 6 this is illustrated with a curved dotted arrow from the aspect A1 of object O1 to object O2.

Figure 7:
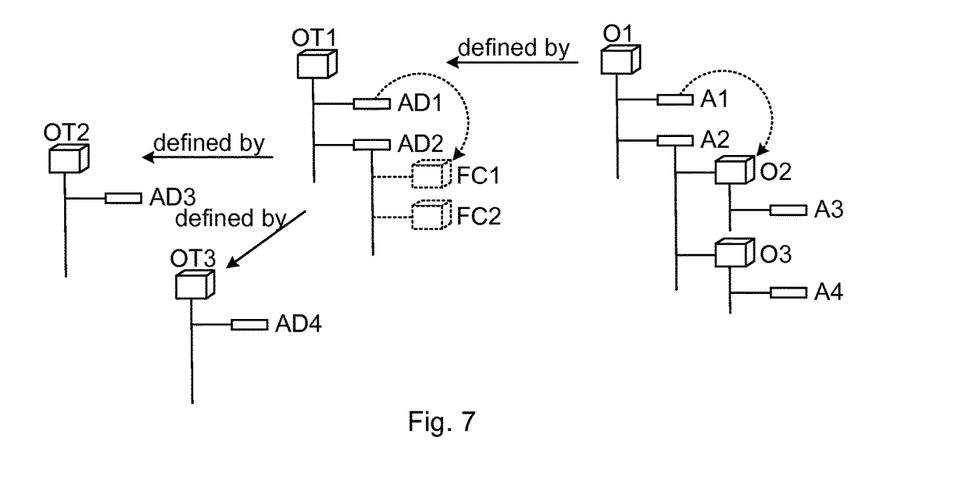

FIG. 7 shows an example of a relative object reference within a structured object type. Aspect definition AD1 of object type OT1 defines a formal object reference that refers to the formal child FC1, represented by a curved dotted arrow in the figure. The object type for the formal object reference is OT2. When an engineer, technician, developer, etc. creates the object O1 as an instance of the type OT1, an object reference from aspect A1 to object O2 is created, represented by a dotted line in FIG. 7.

The embodiments disclosed herein relate to creating objects in a process control system. In order to enable creation of objects in a process control system there is provided a processing tool, a method performed by a processing unit of the processing tool, a computer program comprising code, for example in the form of a computer program product, that when run on the processing unit, causes the processing unit to perform the method.

Figure 15:
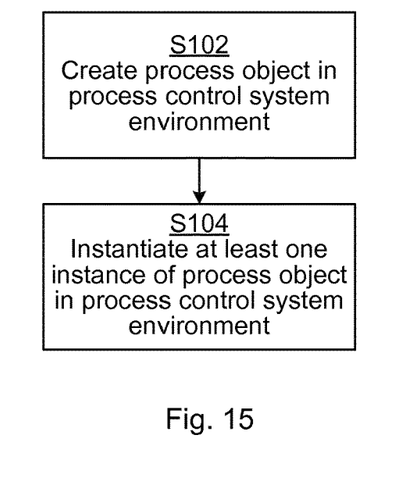
FIG. 15 is a flowchart of a method according to embodiments.

Reference is now made to FIG. 15 illustrating a computer-implemented method for creating software objects in a process control system according to an embodiment.

The method comprises a step S102 of creating a process object in the process control system. The process object has at least two aspects. The process object is defined by a control device object type having the at least two aspects. The control device object type inherits at least one aspect of the at least two aspects from a control object type and inherits at least one other aspect of the at least two aspects from a device object type. In this respect, creating the process object may involve generating software code portions representing the process object and optionally storing the thus generated software code portions.

The method comprises a step S104 of instantiating at least one instance of the process object in the process control system. In this respect, instantiating the at least one instance may involve generating software code portions defining at least one instance of the process object and optionally storing the thus generated software code portions.

Figure 8:
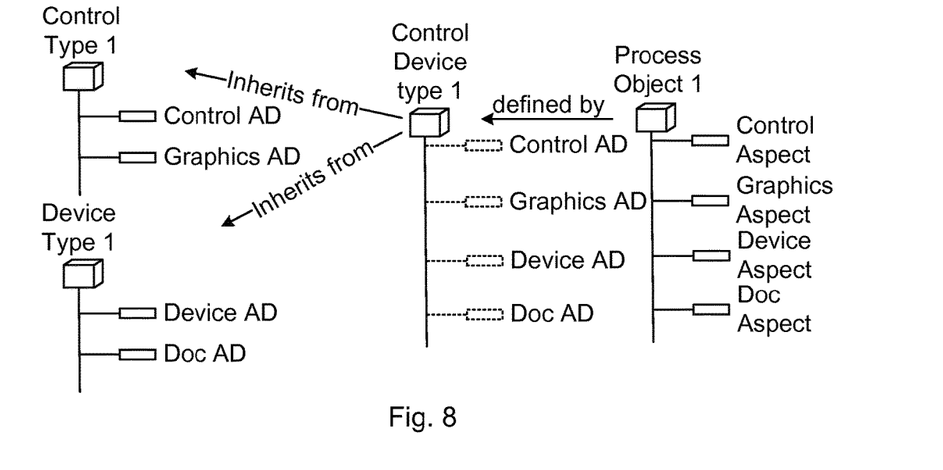

For a specific process control system, combined objects and object types with both device and control functions may thereby be created, for example corresponding to the specific standard used for that process control system. Each of these combined objects and object types thus inherits from one device object type and from one control object type. This is illustrated in FIG. 8. In FIG. 8 Process Object 1 is created from Control Device Type 1 (i.e., a control device object type having at least two aspects) with aspect definitions Control AD, Graphics AD, Device AD, and Doc AD and which inherits from two object types: Control Type 1 and Device Type 1. Control Device Type 1 thus includes control and process device functions for one particular combination of object types without duplicating anything of the specifics of the control and device functions. As the skilled person understands, other combined object types can be created for other combinations.

As disclosed above, the control object type may have aspect definitions of at least one of a control function in the process control system and graphics for an operator interface of the process control system. The control function may be open, close, start, stop, and/or regulate. As disclosed above, the device object type may have aspect definitions of a process device in the process control system.

As disclosed above, the process object may represent a physical device in the process control system. As disclosed above, the physical device may be a sensor, a valve, a pump, or a motor. Alternatively, the process object may represent a logical entity in the process control system.

In general terms, communication between the control function and the device may take place over a signal interface. In general terms, a signal interface consists of one or more input and/or output signals, by which the control function can respectively read from and write to the device. Signals are represented by objects.

Particularly, the control object type and the device object type may inherit at least one signal interface aspect from a common composite signal object type. The composite signal object type may define signal interfaces between the control object type and other object types in the process control system. The composite signal object type may define signal interfaces between device object type and other object types in the process control system. The composite signal object type may specify how control functions and device functions of the process object shall be connected at instantiation of the process object.

The composite signal object type may have an aspect definition that specifies signalling characteristics. In general terms, a Signal object type has an aspect definition that may specify signal characteristics. The signalling characteristics may pertain to at least one of signal type, signal range, and signal direction. The signal type may be Boolean, integer, real, etc. The signal range may be a maximum value and a minimum value, etc. The signal direction may be in or out, etc. There may be different signal object types for different types of signals.

When these object types are instantiated the result may be signal objects that serve as software marshalling points between control functions and devices. Particularly, the signal objects may serve as software marshalling points between control objects and device objects in the process control system.

Figure 9:
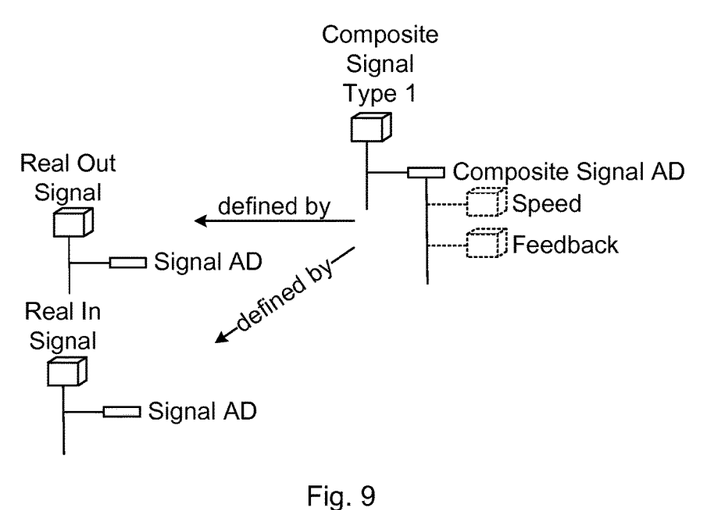

Using the concept of structured object types, several signal objects may thus be grouped as a Composite Signal. A Composite Signal object type may have an aspect definition that specifies one or more formal children of signal object types, thus forming a complete definition of a signal interface consisting of multiple input and/or output signals. FIG. 9 shows a composite signal object type with two formal children defined by the composite signal aspect definition. The formal children are named Speed and Feedback, and are typed Real Out Signal and Real In Signal.

Figure 10:
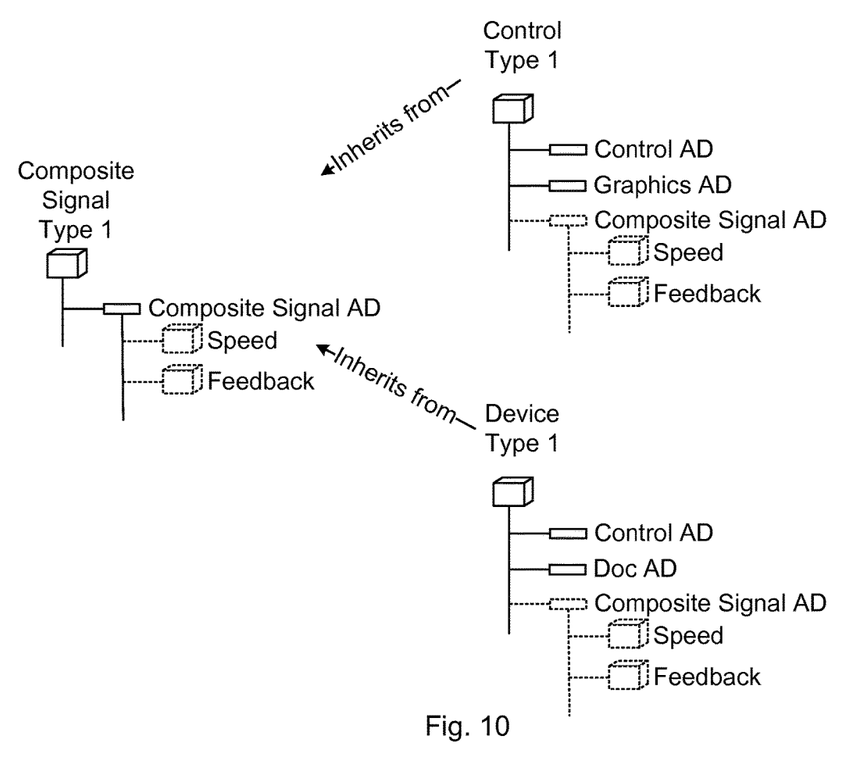

When libraries of control function object types and device object types are created, it may thus be ensured that a particular control function object type and a particular device object type are compatible, i.e. requires respectively provides the same signal interface, by having both object types inherit the signal interface definition from a common Composite Signal supertype. This is illustrated in FIG. 10.

Figure 11:
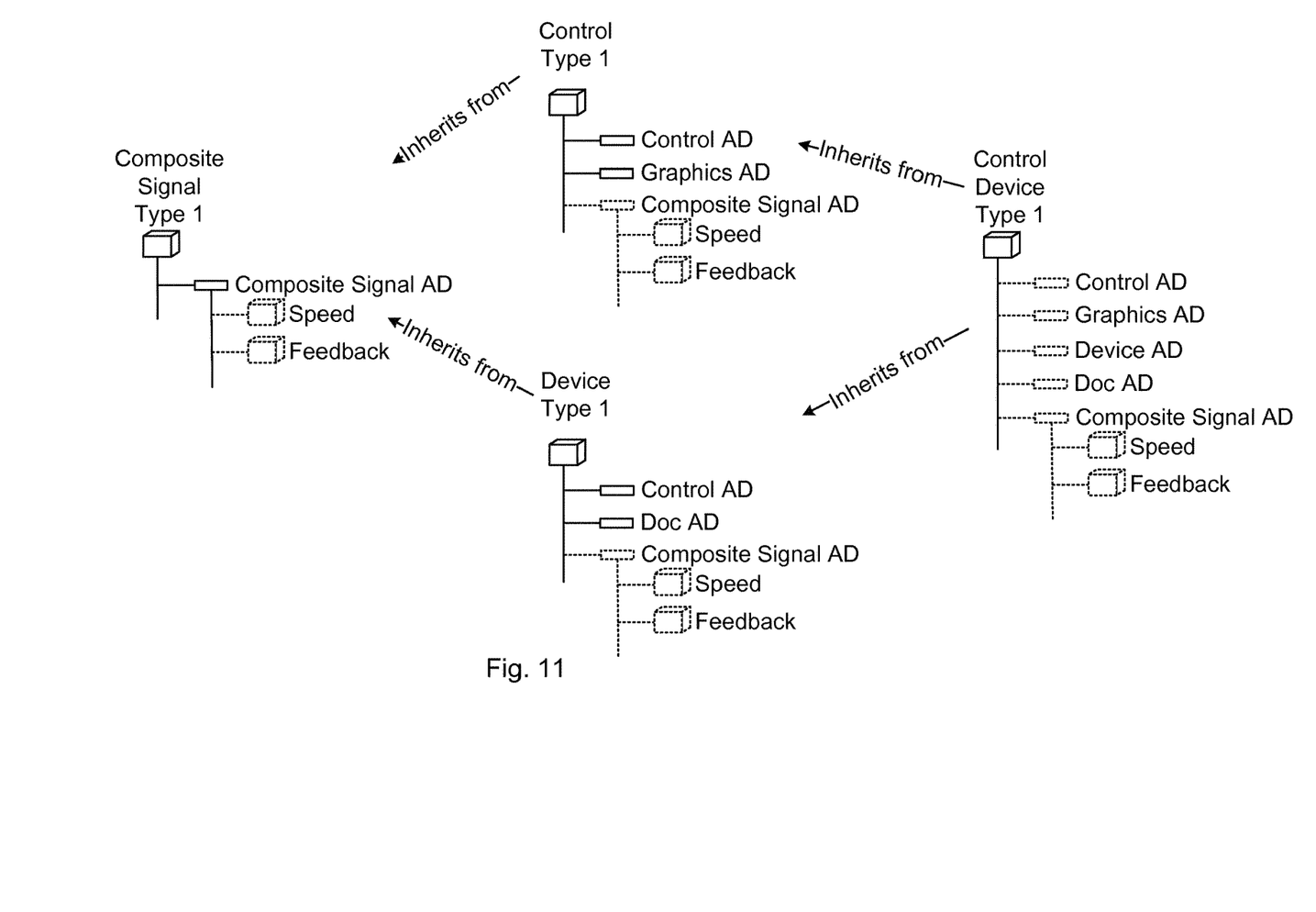

A combined control device object type can now be created by combining a control object type and a device object type through multiple inheritance as shown in FIG. 11. The result is an inheritance diamond. However, the diamond problem described above is avoided by enforcing the second and third rule for multiple inheritance defined above. This also makes it possible to automatically verify if a control function object type and a device object type are compatible, i.e. that they require respectively provide the same signal interface, and thus determine whether combining these types into a combined control device object type is meaningful and therefore should be allowed.

Figure 12:
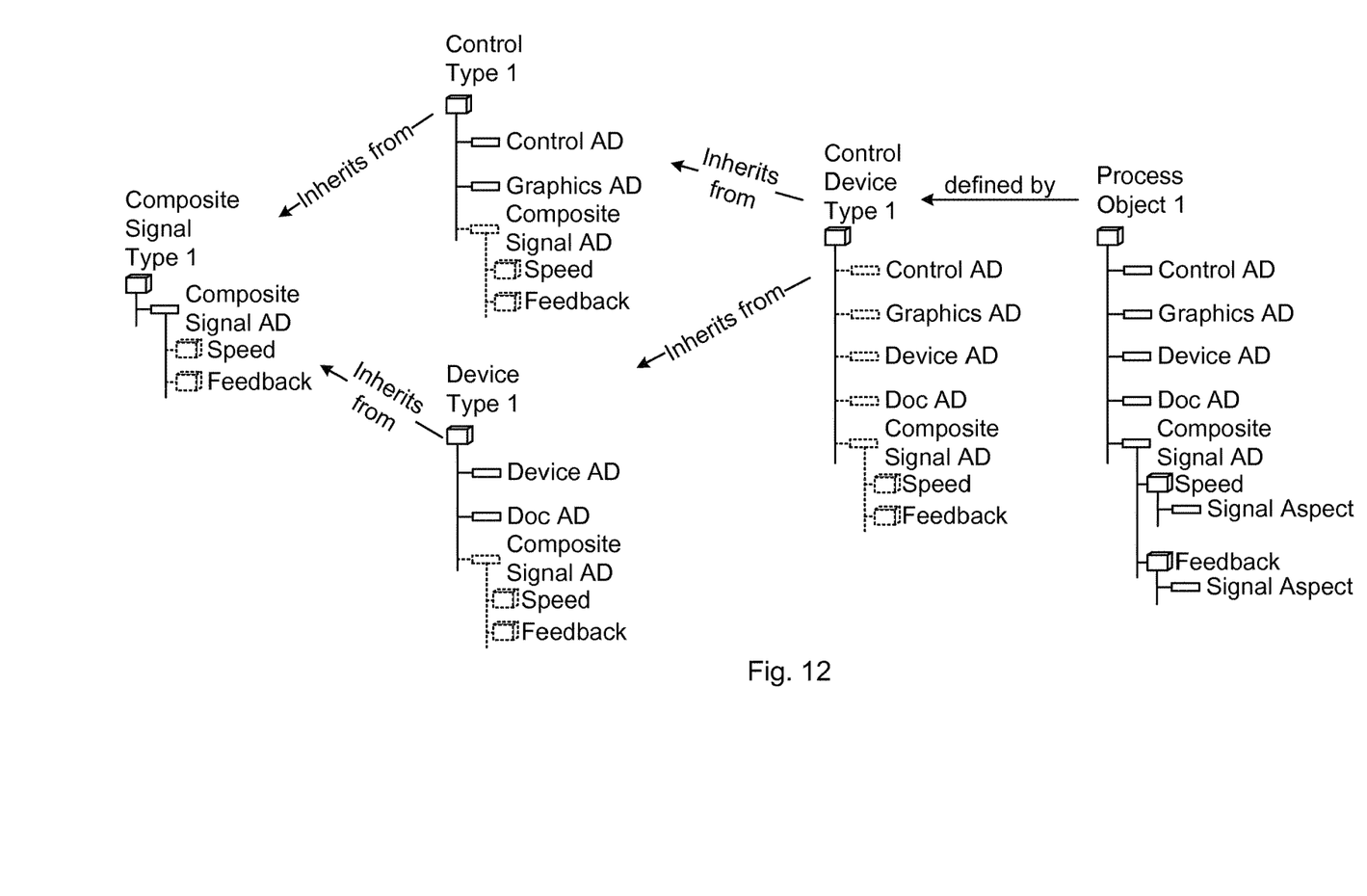

When an instance of the combined control device object type is created, it will have the aspects that are defined by all the aspect definitions of all its supertypes and their supertype. FIG. 12 shows an instance of the combined control device object type with the complete inheritance chain. Even though Control Device Type 1 inherits Composite Signal AD from both its supertypes it will only have one such aspect definition, and the result is that the instance Process Object 1 has only one such aspect.

Figure 13:
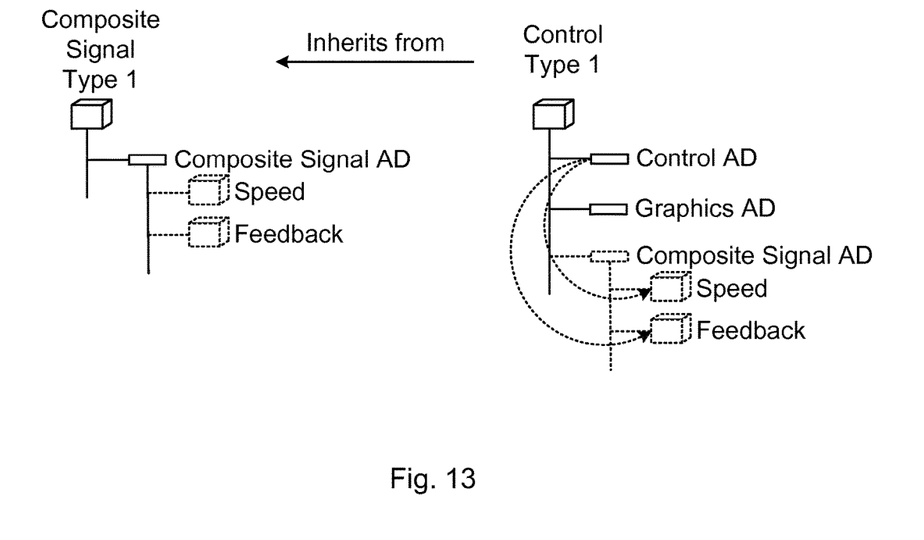

When a control object type is created, it may be specified how the control function shall be connected to signals. This may be accomplished in the control aspect definition by means of formal object references to relevant signal object types. These formal object references are configured to refer to the formal children defined by the inherited composite signal aspect definition as illustrated with curved dotted arrows in FIG. 13.

In a similar way, when a device object type is created it may be specified how the device shall be connected to signals. This may be accomplished in the device aspect definition by means of formal object references to relevant signal object types. These formal object references are configured to refer to the formal children defined by the inherited composite signal aspect definition.

When an instance of the combined control device object type is created, signal objects may be created as actual children to the control device object, as defined by the composite signal aspect definition. Particularly, instantiating at least one instance of the process object, as in step S104, may result in creation of signal objects of the the composite signal object type as actual children to the process object.

Figure 14:
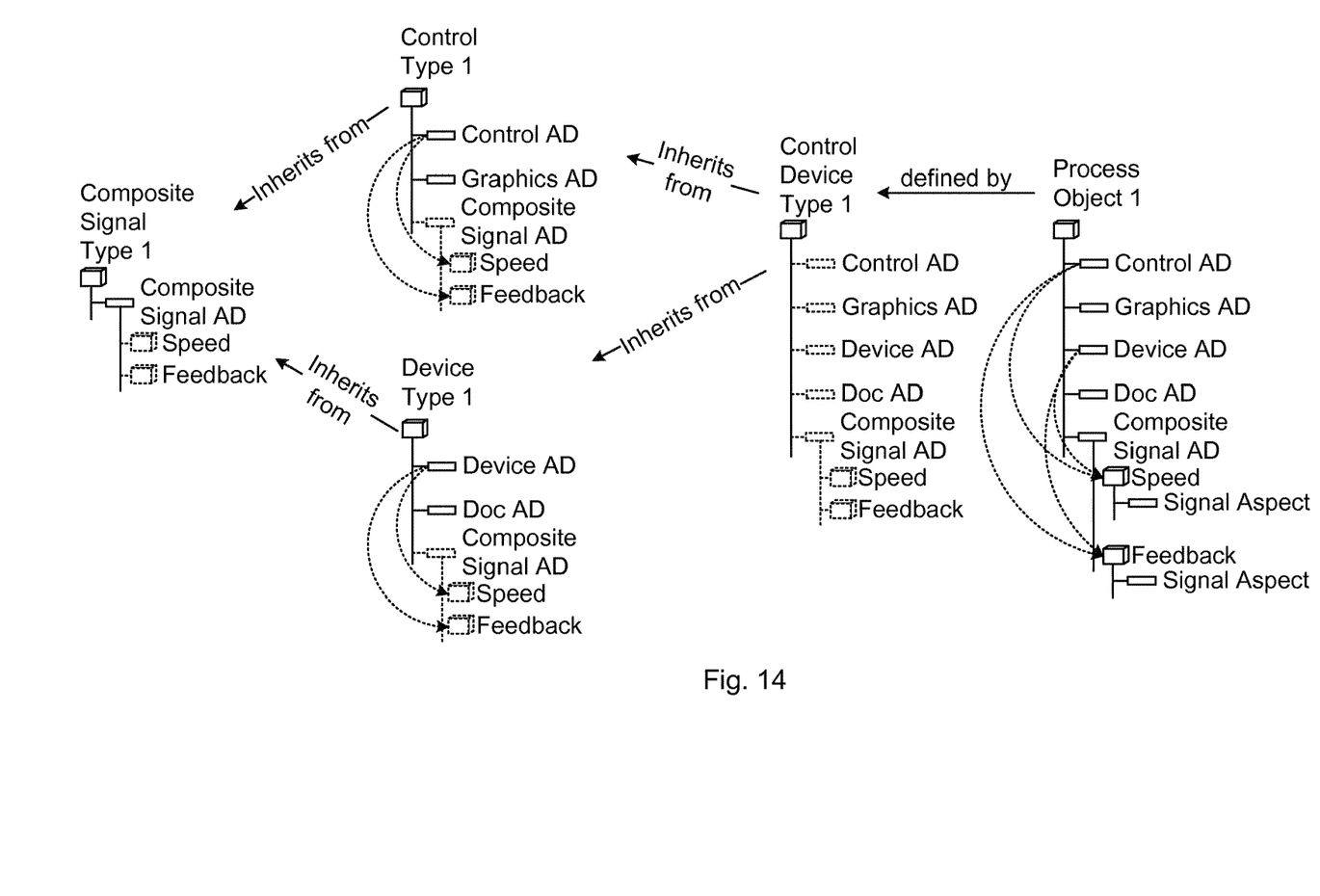

The formal object references specified by the control and device aspect definitions respectively may now result in actual object references to these children. Thus the control function and the device may automatically become connected to each other through the signal interface. This is illustrated in FIG. 14. The Control AD and Device AD aspect definitions both have formal object references of type Real Out Signal and Real In Signal (as in FIG. 9). These formal object references may have default values that specify relative paths to the formal children defined by the inherited aspect definition Composite Signal AD. When Process Object 1 is instantiated these formal object references may result in relative references to the actual children Speed and Feedback (represented by dashed lines in FIG. 14). These object references connect the control functions to the process device, via the signal objects Speed and Feedback.

Figure 16:
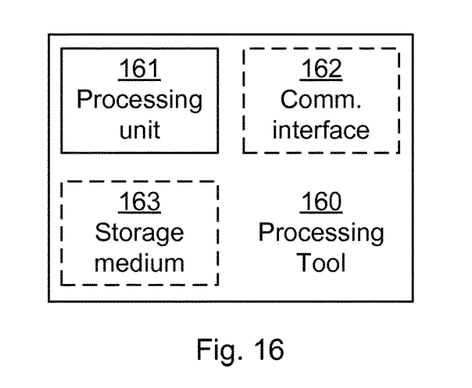
FIG. 16 is a schematic diagram showing functional units of a processing tool according to an embodiment.

The method may be performed by a processing tool. FIG. 16 schematically illustrates, in terms of a number of functional units, the components of a processing tool 160 according to an embodiment. A processing unit 161 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 171 (as in FIG. 17), e.g. in the form of a storage medium 163. Thus the processing unit 161 is thereby arranged to execute methods as herein disclosed. The storage medium 163 may also comprise persistent storage, which, for example, can be any single one or combination of magnetic memory, optical memory, solid state memory or even remotely mounted memory. The processing tool 160 may further comprise a communications interface 162 for communications with other devices and entities in a process control system (as in FIG. 18). As such the communications interface 162 may comprise one or more transmitters and receivers. The processing unit 161 controls the general operation of the processing tool 160 e.g. by sending data and control signals to the communications interface 162 and the storage medium 163, by receiving data and reports from the communications interface 162, and by retrieving data and instructions from the storage medium 163. Particularly, the processing unit 161 is configured to perform step S102 and step S104 as disclosed above. Other components, as well as the related functionality, of the processing tool 160 are omitted in order not to obscure the concepts presented herein.

Figure 17:
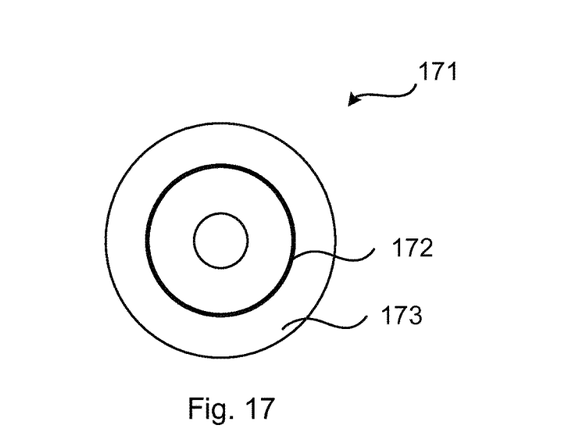
FIG. 17 shows one example of a computer program product comprising computer readable means according to an embodiment.

The method may be provided as a computer program. FIG. 17 shows one example of a computer program product 171 comprising computer readable means 173. On this computer readable means 173, a computer program 172 can be stored, which computer program 172 can cause the processing unit 161 and thereto operatively coupled entities and devices, such as the communications interface 162 and the storage medium 163, to execute methods according to embodiments described herein. Particularly, the computer program 172 comprises instructions which may cause the processing unit 161 to perform step S102 and step S104 as disclosed above. The computer program 172 and/or computer program product 171 may thus provide means for performing any steps as herein disclosed.

In the example of FIG. 17, the computer program product 171 is illustrated as an optical disc, such as a CD (compact disc) or a DVD (digital versatile disc) or a Blu-Ray disc. The computer program product 171 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 172 is here schematically shown as a track on the depicted optical disk, the computer program 172 can be stored in any way which is suitable for the computer program product 171.

The processing tool 160 may be provided as a standalone device or as a part of a further device. For example, the processing tool 160 may be provided in a terminal device, in a network device, and/or in a server. The processing tool 160 may be provided as an integral part of the terminal device, network device, or server. That is, the components of the processing tool 160 may be integrated with other components of the terminal device, network device, or server; some components of the processing tool 160 and the terminal device, network device, or server may be shared. For example, if the terminal device, network device, or server as such comprises a processing unit, this processing unit may be arranged to perform the actions of the processing unit 161 of the processing tool 160. Alternatively the processing tool 160 may be provided as a separate unit in the terminal device, network device, or server.

Figure 18:
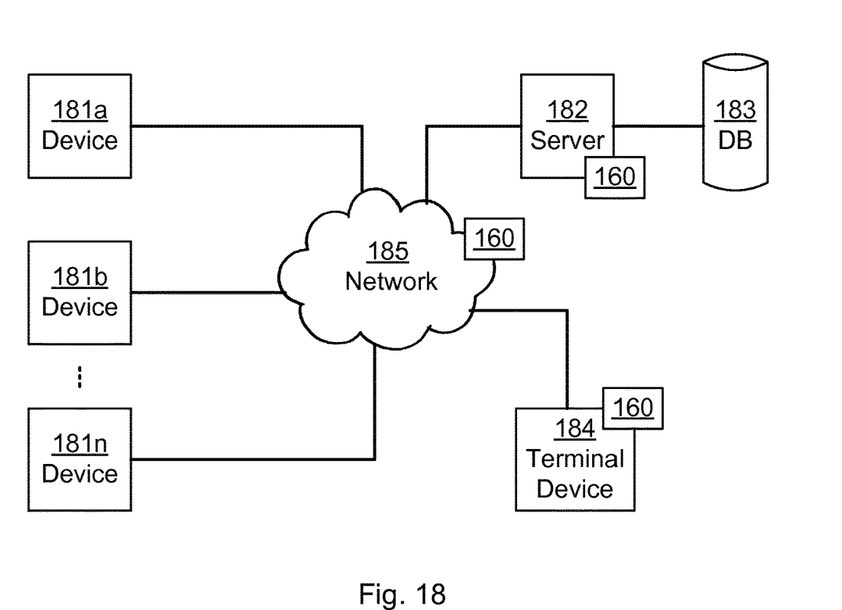
FIG. 18 schematically illustrates a processing control system according to an embodiment.

FIG. 18 schematically illustrates a process control system 180 according to an embodiment. The process control system 180 will be described in an operating state. The process control system 180 may comprise a number of different functional blocks and sub-systems, wherein each functional block or sub-system may be associated with a unique functionality. Each sub-system may be associated with different location in the process control system 180.

The process control system 180 comprises a plurality of process devices 181a, 181b, . . . , 181n. The process devices 181a, 181b, . . . , 181n are operatively connected to a network 185. In general terms, the process control system 180 may comprise hundreds of process devices. Typically the connections between the process devices 181a, 181b, . . . , 181n and the network 185 are narrowband connections. Each of the process devices 181a, 181b, . . . , 181n is a control device typical and common for sensing different events or parameters when controlling various sub-systems in a process control system 180. The process devices 181a, 181b, . . . , 181n may also be denoted as field devices.

The network 185 may be local area network, such as an Intranet. The network 185 may alternatively be a wide area network. The network 185 may be wired, wireless, or any combinations thereof.

One or more terminal devices 184 is also operatively connected to the network 185. The terminal device 184 may comprise an interface for user interaction. The terminal device 184 may be associated with operators, such as engineers, technicians, developers, etc. The terminal device 184 may be a desktop computer, a laptop computer, a tablet computer, a wireless portable communications device, such as a smartphone, etc. The terminal device 184 may comprises a processing tool 160.

A computer server 182 is also operatively connected to the network 185. The server 182 may store data pertaining to events, devices and objects of the process control system 180 in a database (DB) 183. The computer server 182 may run control programs facilitating the control of the process control system 180. The computer server 182 may comprises a processing tool 160.

Communication between the computer server 182, the terminal device 184 and process devices 181a, 181b, . . . , 181n is per se performed in any suitable, known manner, and includes sending various kinds of signals or messages between the devices 181a, 181b, . . . , 181n, 182, 183, 184 operatively connected to the network 185.

Figure 19:
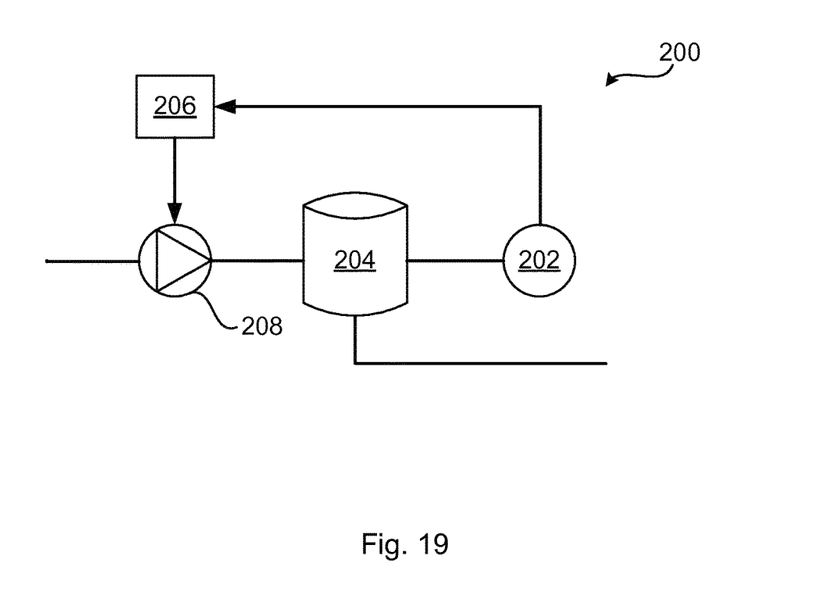
FIG. 19 schematically illustrates an example according to an embodiment.

An example where some of the herein disclosed mechanisms for creating objects in a process control system will now be disclosed with reference to FIG. 19. In the present simplified tank level control example it is demonstrated how process objects are created and instantiated efficiently from object types designed according to the herein disclosed mechanisms. FIG. 19 at reference numeral 200 schematically illustrates part of a process control system, such as a part of the process control system 180 of FIG. 18. FIG. 19 comprises three process objects; a level transmitter device 202 that measures the tank level of tank 204, a variable-speed pump device 208 that controls the inflow to the tank 204, and a PID control function 206 that in turn controls the variable-speed pump device 208.

The two objects 202 and 208 correspond to actual, physical, process devices in the process control system (such as items 181a, 181b in FIG. 18) whereas the object 206 is a function that is executed in the server in the process control system (such as item 182 in FIG. 18).

Furthermore, it is for illustrative and non-limiting purposes assumed that the process control system vendor (being a third party, or any skilled organization) has developed and provided a suitable set of reusable object types to the control engineer team responsible for developing the level control solution (see FIGS. 8 to 14 and the related description thereof for a schematic overview of the contents of the different object types). For example, a set of control types, e.g. for basic interlocks, signal supervision, motor and valve control, and PID control has been provided. The Control Aspect Definition contains the definition of the control strategy for the object. For example, a set of device types, for vendor-specific devices connected on various field buses such as PROFIBUS or PROFINET, has been provided. Examples are motors, pumps, valves, and various transmitter types. Here, the Device Aspect Definition contains the definition of the configuration parameters and runtime data of the device, and the communication method and format.

Using the herein disclosed mechanisms based on multiple inheritance (for example as illustrated in FIG. 11), the control engineer team can now create the combined object types that matches (a) the desired control function, and (b) the actual electrical devices selected for the specific plant. Importantly, this can be achieved without copying or modifying the provided object types. The internals of the provided object types may be hidden and protected from modification. In the present example, it is for illustrating, and non-limiting, purposes assumed that a level transmitter LTx from vendor Va, and a pump of type Py from vendor Vb, are selected to be used in the plant, and that PROFINET is used as field bus. The matching device object types that are available are named Va_LTx and Vb_Py. It is for illustrating, and non-limiting, purposes further assumed that suitable control types for a variable-speed pump and an analog input signal are available. The new, combined object types are assigned suitable names, e.g., Va_LTx_Control and Vb_Py_Control. Note that the object 206 can be created directly from a PID control type, so there may not be a need to create any combined object type.

The control solution for the present example may be created by creating the three process objects from the object types. Each object is assigned a unique name, and parameters and attributes are filled in. Connections between the objects and any needed "glue logic" are added after creation of the objects. Also, an operator user interface for the entire function is preferably assembled using the graphics aspects of the three process objects.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A computer-implemented method for creating software objects in a process control system, the method being performed by a processing tool, the method comprising the steps of:
  creating and executing a process object in the process control system, the process object having at least a control aspect, a graphics aspect, a device aspect, and a doc aspect;
  wherein the process object is defined by a control device object type having said control aspect, said graphics aspect, said device aspect, and said doc aspect;
  wherein the control device object type inherits at least one aspect of said control aspect, said graphics aspect, said device aspect, and said doc aspect from a control object type and inherits at least one other aspect of said control aspect, said graphics aspect, said device aspect, and said doc aspect from a device object type;
  wherein the control object type has first aspect definitions of at least one of a control function in the process control system and has graphics for an operator interface of the process control system;
  wherein the device object type has second aspect definitions of a process device in the process control system;
  wherein the first aspect definitions and the second aspect definitions include inheritance extensibility rules;
  wherein the control object type and the device object type inherit at least one of a signal interface aspect from a common composite signal object type; and
  wherein the common composite signal object type defines signal interfaces between the control object type and other object types in the process control system.

2. The method according to claim 1, wherein the common composite signal object type defines signal interfaces between the device object type and other object types in the process control system.

3. The method according to claim 1, wherein the common composite signal object type specifies how control functions and device functions of the process object shall be connected at instantiation of the process object.

4. The method according to claim 1, wherein the common composite signal object type has an aspect definition that specifies signaling characteristics.

5. The method according to claim 4, wherein the signaling characteristics pertain to at least one of a signal type, a signal range, and a signal direction.

6. The method according to claim 1, wherein instantiating at least one instance of the process object results in creation of signal objects of the common composite signal object type as actual children to the process object.

7. The method according to claim 6, wherein the signal objects serve as software marshalling points between control objects and device objects in the process control system.

8. The method according to claim 1, wherein the control function is at least one of open, close, start, stop, and regulate.

9. The method according to claim 1, wherein the process object represents a physical device in the process control system.

10. The method according to claim 9, wherein the physical device is a sensor, a valve, a pump, or a motor.

11. The method according to claim 1, wherein the process object represents a logical entity in the process control system.

12. A processing tool for creating software objects in a process control system, the processing tool comprising a processing unit, the processing unit being configured to:
  create and execute a process object in the process control system, the process object having at least a control aspect, a graphics aspect, a device aspect, and a doc aspect;
  wherein the process object is defined by a control device object type having said control aspect, said graphics aspect, said device aspect, and said doc aspect;
  wherein the control device object type inherits at least one aspect of said control aspect, said graphics aspect, said device aspect, and said doc aspect from a control object type and inherits at least one other aspect of said control aspect, said graphics aspect, said device aspect, and said doc aspect from a device object type;
  wherein the control object type has first aspect definitions of at least one of a control function in the process control system and has graphics for an operator interface of the process control system;
  wherein the device object type has second aspect definitions of a process device in the process control system;
  wherein the first aspect definitions and the second aspect definitions include inheritance extensibility rules;
  wherein the control object type and the device object type inherit at least one of a signal interface aspect from a common composite signal object type; and
  wherein the common composite signal object type defines signal interfaces between the control object type and other object types in the process control system.

13. The processing tool according to claim 12, wherein the common composite signal object type defines signal interfaces between the device object type and other object types in the process control system.

14. A computer program product comprising a computer program stored on a non-transitory computer-readable memory, the computer program for creating software objects in a process control system, which, when run on a processing unit causes the processing unit to:
  create and execute a process object in the process control system, the process object having at least a control aspect, a graphics aspect, and a device aspect, and a doc aspect; wherein the process object is defined by a control device object type having at least said control aspect, said graphics aspect, said device aspect, and said doc aspect;
  wherein the control device object type inherits at least one aspect of said control aspect, said graphics aspect, said device aspect, and said doc aspect from a control object type and inherits at least one other aspect of said control aspect, said graphics aspect, said device aspect, and said doc aspect from a device object type;
  wherein the control object type has first aspect definitions of at least one of a control function in the process control system and has graphics for an operator interface of the process control system;
  wherein the device object type has second aspect definitions of a process device in the process control system;

wherein the first aspect definitions and the second aspect definitions include inheritance extensibility rules;

wherein the control object type and the device object type inherit at least one of a signal interface aspect from a common composite signal object type;

wherein the common composite signal object type defines signal interfaces between the control object type and other object types in the process control system.

15. A terminal device for Object Oriented Processing comprising:

a processor;

a non-transitory memory having a computer program product for creating and executing a process object in a process control system, the process object having at least a control aspect, a graphics aspect, a device aspect, and a doc aspect;

wherein the process object is defined by a control device object type having said control aspect, said graphics aspect, said device aspect, and said doc aspect;

wherein the control device object type inherits at least one aspect of said control aspect, said graphics aspect, said device aspect, or said doc aspect from a control object type and inherits at least one other aspect of the said control aspect, said graphics aspect, said device aspect, or said doc aspect from a device object type;

wherein the control object type has first aspect definitions of at least one of a control function in the process control system and has graphics for an operator interface of the process control system;

wherein the device object type has second aspect definitions of a process device in the process control system;

wherein the first aspect definitions and the second aspect definitions include inheritance extensibility rules;

wherein the control object type and the device object type inherit at least one of a signal interface aspect from a common composite signal object type; and wherein the common composite signal object type defines signal interfaces between the control object type and other object types in the process control system.

16. The terminal device of claim 15, wherein a subtype adds aspect definitions to inherited aspect definitions.

17. The terminal device of claim 15, wherein the process control system includes three process objects:

a level transmitter device for measuring a content level of a tank within an industrial plant;

a variable-speed pump device for controlling an inflow to said tank; and a PID control function for controlling said variable-speed pump device.

\* \* \* \* \*